UNITED STATES PATENT OFFICE.

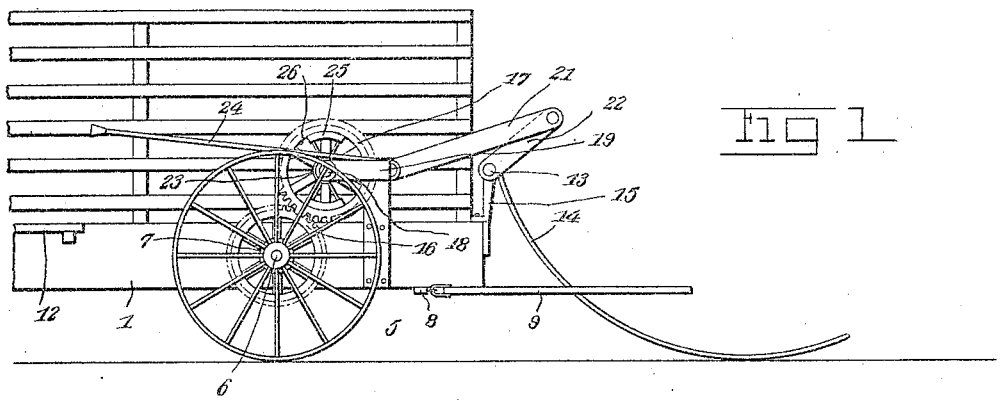
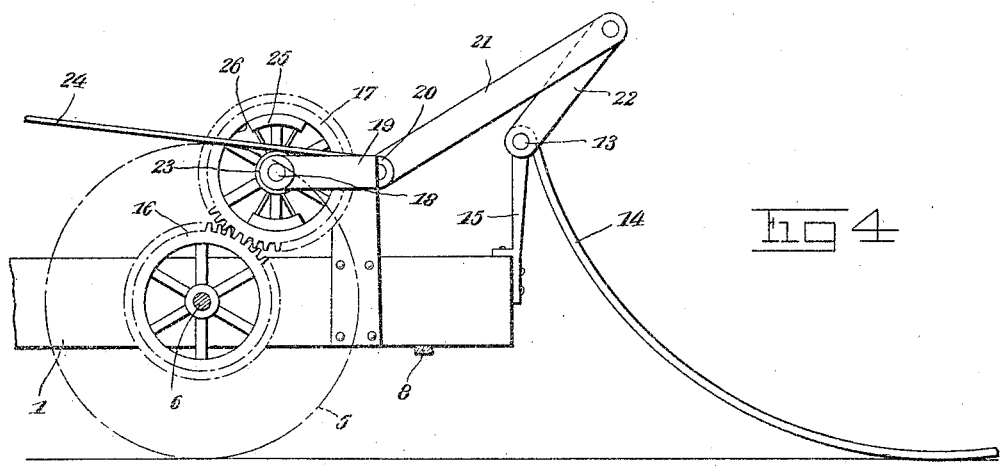
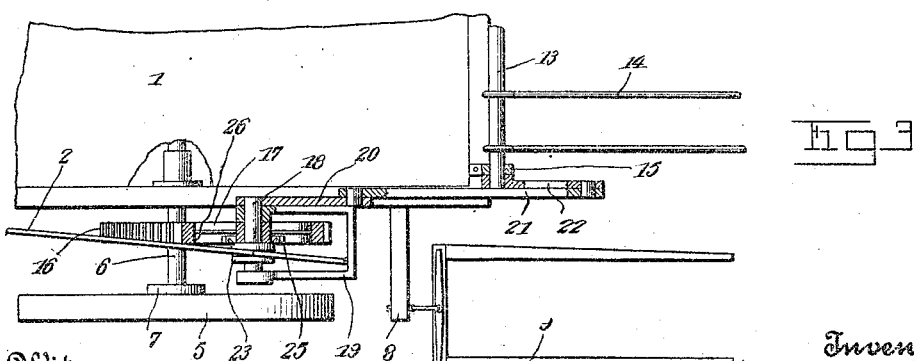

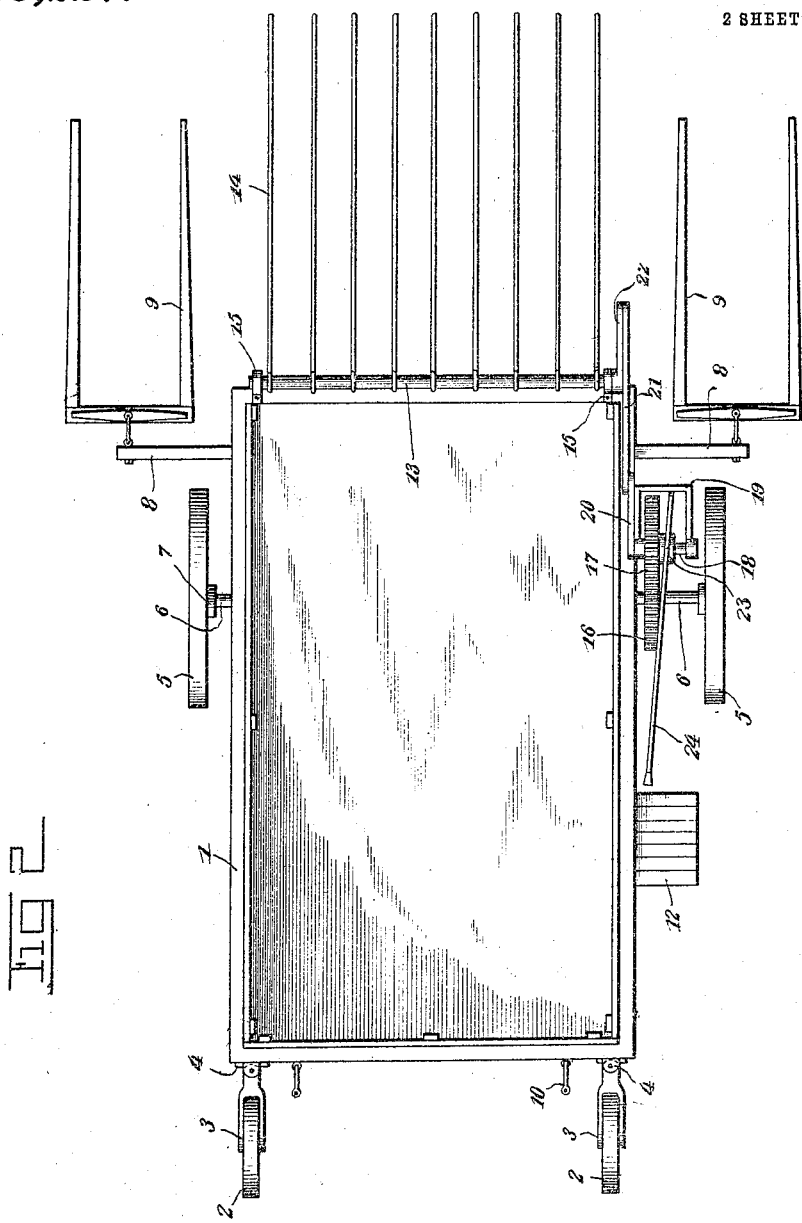

FRANK JOHNSON, OF AUDUBON, MINNESOTA.

LOADER AND CARRIER.

999,227.

Specification of Letters Patent.  Patented Aug. 1, 1911.

Application filed April 13, 1911. Serial No. 620,719.

*To all whom it may concern:*

Be it known that I, FRANK JOHNSON, a citizen of the United States, residing at Audubon, in the county of Becker and State of Minnesota, have invented certain new and useful Improvements in Loaders and Carriers, of which the following is a specification.

This invention relates to a loader and carrier embodying a wagon or like vehicle and automatic means carried thereby for taking up and loading the same with bundles of grain as they are shocked in the field, whereby the bundles of grain may be readily and expeditiously picked up and loaded into the wagon body and then transported to the stack or to a threshing machine.

The principal object of the invention is to provide a simple, durable and efficient loader and carrier of this character in which the loading mechanism, is placed under complete manual control, and which requires in its operation by a minimum number of attendants and draft animals.

The invention consists of the features of construction, combination and arrangement of parts hereinafter fully described and claimed, reference being had to the accompanying drawings, in which:

Figure 1 is a view in side elevation of a loader and carrier constructed in accordance with my invention. Fig. 2 is a top plan view of the same. Fig. 3 is a sectional plan of the fork operating mechanism on an enlarged scale. Fig. 4 is an enlarged detail view in side elevation of certain parts of the fork operating mechanism.

Referring to the drawings, 1 designates a vehicle body, such as an ordinary wagon rack bed, mounted at its rear end upon caster wheels 2 journaled in forks 3 swiveled to brackets 4, and at its front end upon wheels 5 journaled upon the extended ends of a transverse axle 6. Each wheel 5 has any ordinary or preferred pawl and ratchet clutch-drive connection 7 with the axle for imparting driving motion thereto and enabling the apparatus to be readily turned and steered. Draft bars 8 project from the sides of the body adjacent the front end thereof and are adapted for the attachment thereto of shafts 9, whereby two draft animals, one at each side of the apparatus, may be employed to draw the apparatus across the field. Clevises 10 are provided upon the rear of the body to which the shafts may be coupled for the attachment of the draft animals for greater convenience in hauling the apparatus from place to place when not in use, and for hauling the apparatus when loaded from a loading point to a stack or threshing machine.

The apparatus is designed to be handled by two attendants only, who take positions at opposite sides of the body 1, the attendant on the left hand side leveling up and controlling the shocks or bundles as they are thrown into the body, while the attendant at the right hand side controls the draft animals and the operation of the loading mechanism. For the convenience of the latter named attendant, a platform 12 is provided on which he may stand. The loading mechanism referred to comprises a fork consisting of a head bar or rod 13 carrying curved tines 14 and journaled in bearing brackets 15 at the front of the body 1. As the vehicle travels across the field in operation, the forward ends of the tines run in contact with or just above the surface of the ground and beneath the bundles or shocks, whereby the latter will be picked up and held ready to be pitched by the action of the fork into the wagon body.

Fixed to the extended end of the drive axle at the right hand side of the body is a drive gear 16 meshing with a transmission gear 17 loosely mounted on a shaft 18 journaled on a bracket 19, which shaft 18 carries a crank arm 20 coupled by a pitman or connecting rod 21 with a crank arm 22 on the adjacent end of the fork head. On each complete revolution of the shaft the crank and pitman connection tilts the fork upwardly and rearwardly to pitch the gathered bundles or shocks into the wagon and then tilts the fork downwardly and forwardly back to normal position. The gear 17 is driven constantly by the gear 16, but normally turns loosely on the shaft 18, and hence does not affect the crank and pitman mechanism.

Feathered to slide upon and rotate with the shaft 18 is a sleeve 23 adjustable inwardly and outwardly by means of a lever 24 pivoted to the bracket and arranged to be conveniently operated by the attendant standing on the platform 12. Pivotally mounted friction blocks or shoes 25 are adapted by the movements of the sleeve to be thrown into and out of engagement with a friction surface 26 on the gear 17, whereby the latter may be fixed to the shaft to turn therewith and thereby transmit motion to the crank and pitman mechanism to operate the fork. It will thus be understood that the fork may be thrown into action when desired to throw the bundles or shocks into the wagon, and that when the latter is filled the load may be transported by the apparatus to a stack or thresher.

Having thus described my invention, what I claim and desire to secure by Letters Patent is:

1. A loader and carrier comprising a wheeled vehicle having a driving axle, a swinging fork provided with a crank arm, a transmission shaft provided with a crank arm, a pitman rod connecting said crank arms, gearing for driving said shaft from the axle, and clutch mechanism for throwing said gearing into and out of action.

2. A loader and carrier comprising a wheeled vehicle having a driving axle, a swinging fork provided with a crank arm, a transmission shaft provided with a crank arm, a pitman rod connecting said crank arms, a gear fixed to the axle, a gear loose on the shaft, a clutch device for connecting said gear with and disconnecting it from the shaft, and a lever for operating said clutch device.

In testimony whereof I affix my signature in presence of two witnesses.

FRANK JOHNSON.

Witnesses:
A. T. SAMPLE,
C. E. D. WOOD.